(12) United States Patent
Odate

(10) Patent No.: US 7,868,572 B2
(45) Date of Patent: Jan. 11, 2011

(54) SEATBELT APPARATUS

(75) Inventor: Shotaro Odate, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 12/039,138

(22) Filed: Feb. 28, 2008

(65) Prior Publication Data
US 2008/0211442 A1    Sep. 4, 2008

(30) Foreign Application Priority Data
Mar. 1, 2007    (JP)    ............... 2007-051299

(51) Int. Cl.
*H02K 29/08*    (2006.01)
(52) U.S. Cl. ............... 318/400.38; 318/286; 318/652; 318/430; 318/434
(58) Field of Classification Search ........... 318/256, 318/257, 280, 400.01, 400.14, 400.38, 560, 318/652, 661, 700, 779, 289, 650, 651, 400.22, 318/430, 432, 434, 704, 773, 823; 280/802, 280/803, 804, 807; 242/390.9
See application file for complete search history.

(56) References Cited

U.S. PATENT DOCUMENTS

| | | | | |
|---|---|---|---|---|
| 3,818,292 | A * | 6/1974 | Berman ............... | 318/139 |
| 6,290,159 | B1 * | 9/2001 | Specht et al. ........ | 242/379.1 |
| 6,447,012 | B2 * | 9/2002 | Peter et al. .......... | 280/806 |
| 6,485,057 | B1 * | 11/2002 | Midorikawa et al. ..... | 280/807 |
| 6,741,049 | B2 * | 5/2004 | Kawaji et al. ........ | 318/400.11 |
| 7,180,258 | B2 * | 2/2007 | Specht et al. ........ | 318/432 |
| 7,237,640 | B2 * | 7/2007 | Tobata .............. | 180/268 |
| 7,251,111 | B2 * | 7/2007 | Tanaka et al. ........ | 318/400.01 |
| 7,397,208 | B2 * | 7/2008 | Tanaka et al. ........ | 318/264 |
| 7,431,340 | B2 * | 10/2008 | Midorikawa .......... | 280/806 |
| 7,481,460 | B2 * | 1/2009 | Odate ............... | 280/806 |
| 7,506,833 | B2 * | 3/2009 | Tanaka .............. | 242/374 |
| 2001/0037907 | A1 | 11/2001 | Peter et al. | |
| 2005/0011980 | A1 | 1/2005 | Prokscha et al. | |
| 2006/0214043 | A1 * | 9/2006 | Nomura ............. | 242/374 |
| 2007/0295852 | A1 * | 12/2007 | Midorikawa ......... | 242/390.9 |

FOREIGN PATENT DOCUMENTS

| | | |
|---|---|---|
| DE | 203 11 004 | 12/2003 |
| EP | 1 498 325 | 1/2005 |
| JP | 2005-297781 | 10/2005 |

* cited by examiner

*Primary Examiner*—Walter Benson
*Assistant Examiner*—Antony M Paul
(74) *Attorney, Agent, or Firm*—Rankin, Hill & Clark LLP

(57) ABSTRACT

This seatbelt apparatus includes: a belt reel around which a belt is wound; a motor which rotationally drives the belt reel; a transmitting device which transmits a driving power between the belt reel and the motor; a controller which drives the motor while controlling an electricity to be supplied to the motor; a rotation-detection device which detects a rotation status of the belt reel. The rotation-detection device outputs, in accordance with a rotation of the belt reel, a plurality of outputs including signals indicating a first state in which a current consumption by the rotation-detection device is larger than a predetermined value, and a second state in which the current consumption by the rotation-detection device is smaller than the predetermined value. The controller executes a first motor-driving process in which the motor is driven based on an output from the rotation-detection device until reaching the second state.

6 Claims, 4 Drawing Sheets

SEATBELT APPARATUS

BACKGROUND OF THE INVENTION

Priority is claimed on Japanese Patent Application No. 2007-051299, filed Mar. 1, 2007, the contents of which are incorporated herein by reference.

1. Field of the Invention

The present invention relates to a seatbelt apparatus.

2. Description of Related Art

A conventional seatbelt apparatus is known in which a motor as a driving source for winding a belt is provided, and the belt is wound around a belt reel upon connecting the motor to the belt reel at the time a passenger needs to be restricted. In order to appropriately wind the belt, the seatbelt apparatus includes a drawing and winding amount measuring unit. A rotation of the belt reel is controlled based on the measured result obtained by the drawing and winding amount measuring unit (e.g., see Japanese Unexamined Patent Application, First Publication No. 2005-297781).

The drawing and winding amount measuring unit includes a disk-like rotation member in which a portion for passing magnetic flux and a portion for shielding magnetic flux are alternatively arranged in the circumferential direction so as to be positioned on the same axis of the belt reel, and two hall elements which are arranged with the rotation member interposed therebetween so that an attachment angle is different from that of a magnet. Accordingly, the drawing and winding amount measuring unit can accurately measure a drawing and winding amount of the belt based on the output from the hall elements.

However, in the above-described seatbelt apparatus, since the belt may be drawn or wound irrespective of whether an ignition of a vehicle is in an ON state or an OFF state, it is necessary to detect a current position of the belt by operating the drawing and winding amount measuring unit even when the ignition is in an OFF state. Meanwhile, consumption current of the hall elements may be in a high state or a low state depending on the detection position, and thus when the hall elements are stopped in the state where consumption current is in a high state, dark current as consumption current is maintained in a high state when the ignition is in an OFF state, thereby increasing a load on a battery.

Therefore, an object of the present invention is to provide a seatbelt apparatus that is designed to reduce a load of a battery by restricting dark current.

SUMMARY OF THE INVENTION

The present invention employs the followings in order to achieve the above object.

That is, a seatbelt apparatus of the present invention is provided with: a belt reel around which a belt is wound; a motor which rotationally drives the belt reel; a transmitting device which transmits a driving power between the belt reel and the motor; a controller which drives the motor while controlling an electricity to be supplied to the motor; a rotation-detection device which detects a rotation status of the belt reel, wherein: the rotation-detection device outputs, in accordance with a rotation of the belt reel, a plurality of outputs including signals indicating a first state in which a current consumption by the rotation-detection device is larger than a predetermined value, and a second state in which the current consumption by the rotation-detection device is smaller than the predetermined value; and the controller executes a first motor-driving process in which the motor is driven based on an output from the rotation-detection device until reaching the second state.

According to the seatbelt apparatus, the rotation-detection device outputs, in accordance with the rotation of the belt reel, the plurality of outputs including the signals indicating the first state in which the current consumption by the rotation-detection device is larger than the predetermined value, and the second state in which the current consumption by the rotation-detection device is smaller than the predetermined value. In addition, by executing the first motor-driving process by the controller, it is possible to set the rotation-detection device to the second state where the current consumption is smaller. Accordingly, it is possible to suppress the current consumption by the rotation-detection device, and thereby decreasing a load on a battery.

The controller may include a timer which works for a predetermined time since the rotation-detection device has reached the second state, and may repeat the first motor-driving process when the rotation-detection device is shifted to the first state while the timer is in operation.

In this case, when the rotation-detection device is shifted to the first state while the timer is in an operation which works for the predetermined time since the rotation-detection device has reached the second state, it is possible to execute the first motor-driving process which sets the rotation-detection device to the second state again. Accordingly, the current consumption can be suppressed more reliably.

The controller may repeat the first motor-driving process until the rotation-detection device reaches the second state again when the rotation-detection device is shifted from the second state to the first state, and may stop repeating the first motor-driving process after executing the first motor-driving process for predetermined times, even when the rotation-detection device is in the first state.

In this case, when the rotation-detection device is shifted from the second state to the first state, and is returned to the first state again even though the first motor-driving process is repeated in order to set to the second state, if the second state cannot be maintained by repeating the first motor-driving process for the predetermined times, then there is a possibility in that the motor and/or the rotation-detection device are/is malfunctioning. Therefore, in this case, according to the present invention, it is possible to stop driving the motor in order to prevent ineffective motor driving. Accordingly, the current consumption by the motor can be reduced to reduce the load on a battery, and thereby preventing the load on a malfunctioning portion.

It may arranged such that, if the controller has detected that the rotation-detection device has shifted to the first state after shifting to the second state by executing the first motor-driving process, then the controller executes a second motor-driving process in which the motor is driven in a backward direction in relation to a rotational direction in the first motor-driving process, until the rotation-detection device reaches the second state.

In this case, when for example a device which can feed the belt by the motor is employed, if the desired result cannot be obtained by rotating the motor in the rotational direction of winding the belt, then the belt reel can be rotated in the opposite rotational direction. Furthermore, if for example the conventional device which detaches the transmitting device by reversely rotating the motor, then the connection between the motor and the belt reel is disconnected, and thereby enabling a generation of the predetermined rotation by the weight of a tongue or by an urging force by a spring or the like. Therefore, even when the desired result cannot be obtained in the rotational direction of winding the belt, the rotation-detection device can be shifted to the second state where the current consumption is smaller. Accordingly, the load on a battery can be reduced more reliably.

The controller may continue controlling the electricity to be supplied to the motor so as to be constant, until the rotation-detection device reaches the second state.

In this case, since the motor is controlled by the constant electricity, it is possible to shift the rotation-detection device to the second state without causing uncomfortableness to an occupant due to discontinuous rotation of the belt reel.

The controller may include a current-measuring device which measures the current to be supplied to the motor, and may decrease or stop the electricity to be supplied to the motor while driving the motor, if the current measured by the current-measuring device exceeds a predetermined value.

In this case, when the measured current measured by the current-measuring device exceeds the predetermined value while driving and controlling the motor, there is a possibility in that the motor is not in operation even though the controller tries to drive and control the motor. Accordingly, it is possible to protect the motor by decreasing or stopping the electricity to be supplied to the motor.

DETAILED DESCRIPTION OF THE INVENTION

Hereinafter, an exemplary embodiment of the present invention will be described with reference to the accompanying drawings.

Figure 1:
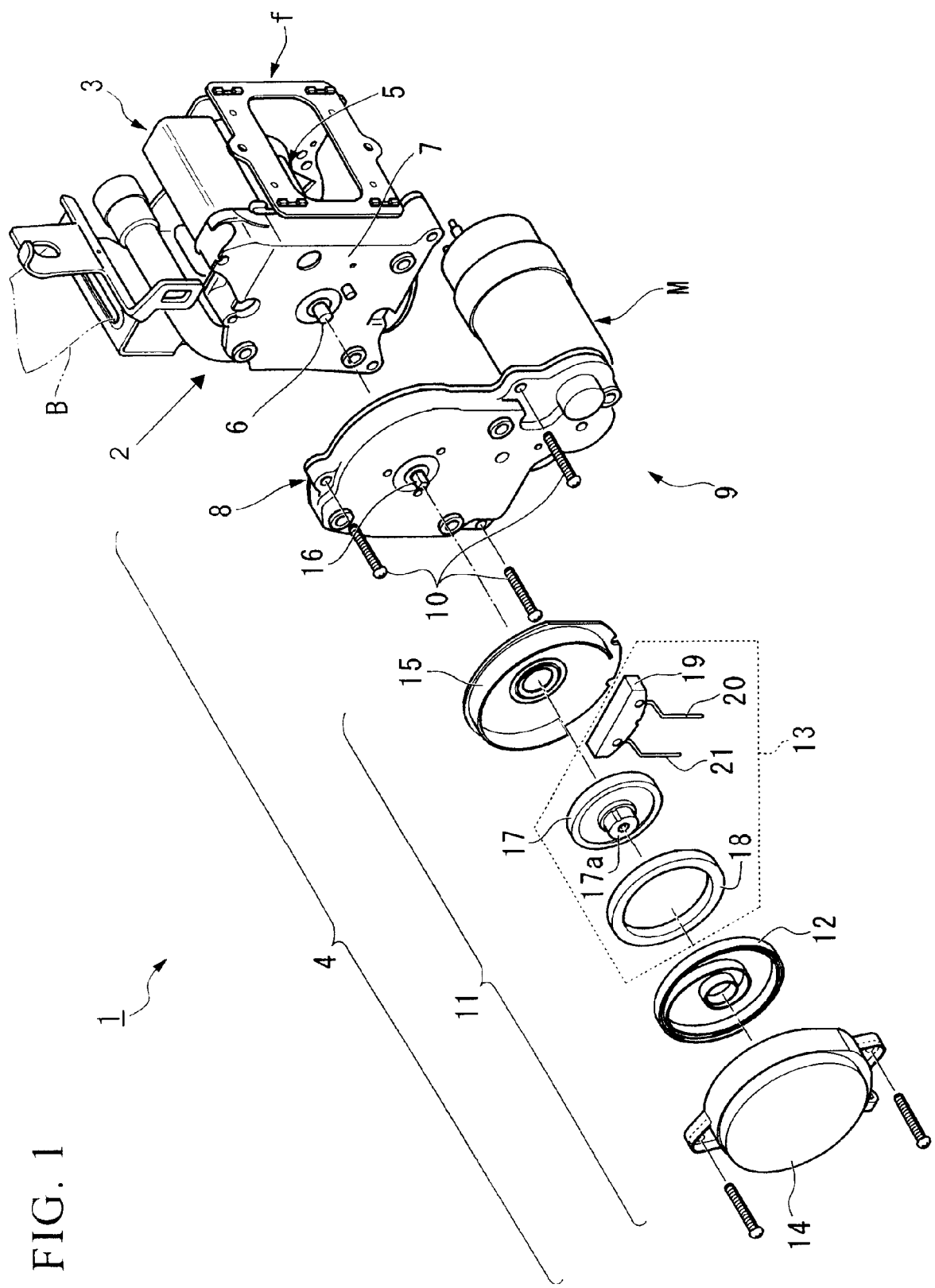
FIG. 1 is an exploded perspective view illustrating a seatbelt unit according to an embodiment of the present invention.

In FIG. 1, reference numeral 1 denotes a seatbelt unit. The seatbelt unit 1 is disposed in a driver seat, an assistant seat, and a side portion of a rear seat in a vehicle, and mainly includes an ELR (Emergency Locking Retractor) 2 which locks a belt B when collision of the vehicle occurs or abrupt force is applied to a brake, etc., a pretensioner 3 which performs initial restraint by instantly winding the belt B upon detecting a strong shock caused by a collision, etc in the forward direction, and a retractor 4 which generates driving force for winding the belt. The ELR 2 and the pretensioner 3 are integrally mounted to each other by a frame f. In this embodiment, a case will be described in which the seatbelt unit 1 is disposed in the driver seat and the assistant seat.

The ELR 2 includes a spindle 5 around which the belt B is wound. At this time, a rotation shaft 6 of the spindle 5 is axially supported by the frame f and the end portion of the rotation shaft 6 protrudes from a side wall 7 of the frame f in a side direction.

The pretensioner 3 rotates the spindle 5 of the ELR 2 in the winding direction by an explosive exploded upon detecting a strong shock in the forward direction, and then performs a fixing operation.

The retractor 4 includes a driver 9 having a motor M which applies driving force for winding the belt B and a gear 8 which transmits the driving force from the motor M to the rotation shaft 6 of the spindle 5. At this time, the driver 9 is fixed to the side wall 7 of the frame f by a plurality of screws 10. The gear 8 is configured to transmit the driving force from the motor M to the rotation shaft 6 of the spindle 5 and is configured to release a connecting action between the motor M and the spindle 5 by a latch mechanism (not shown).

Additionally, a retractor main body 11 is fixed to the driver 9. The retractor main body 11 is configured such that a spring 12 as a so-called torsion spring and a rotation angle sensor 13 are received in a casing including an upper case 14 and a lower case 15.

The rotation angle sensor 13 measures a rotation position of the spindle 5, that is, a drawn amount of the belt B, and includes a retainer 17 which is substantially formed in a disk shape so as to be connected to a rotation shaft 16 of the gear 8 connected to the rotation shaft 6 of the spindle 5, a magnetic pole ring 18 which is formed in a circular ring shape so as to be fitted to the circumference of the retainer 17, and a sensor 19 which measures magnetic pole of the magnetic pole ring 18. The magnetic pole ring 18 is configured such that N pole and S pole are arranged alternatively (e.g., by every 4 degree in a rotation angle) in the circumferential direction. Meanwhile, the sensor 19 is provided with two hall elements, a first hall element 20 and a second hall element 21 which are arranged at a predetermined rotation angle.

The spring 12 is configured such that the base end portion at the center thereof is connected to a shaft portion 17a of the retainer 17. At this time, when the belt B is drawn so that the spindle 5 rotates, the retainer 17 rotates to thereby allow the spring 12 to be wound. When the spring 12 is wound in this way, the spindle 5 is urged in a direction where the belt B is configured to be wound.

Figure 2:
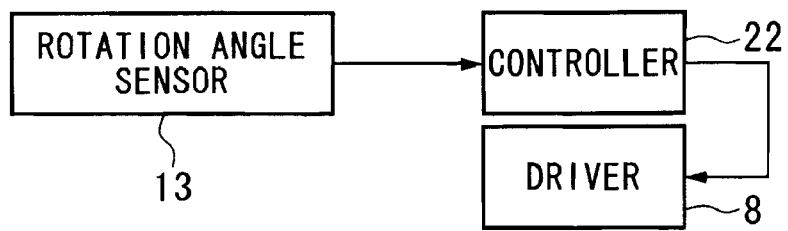
FIG. 2 is a system block diagram illustrating the seatbelt unit.

As shown in FIG. 2, the rotation angle sensor 13 is connected to a controller 22. The controller 22 detects a wound amount of the belt B, and controls the driving operation of the motor M (see FIG. 1) of the driver 8 based on the measured wound amount.

Figure 3:
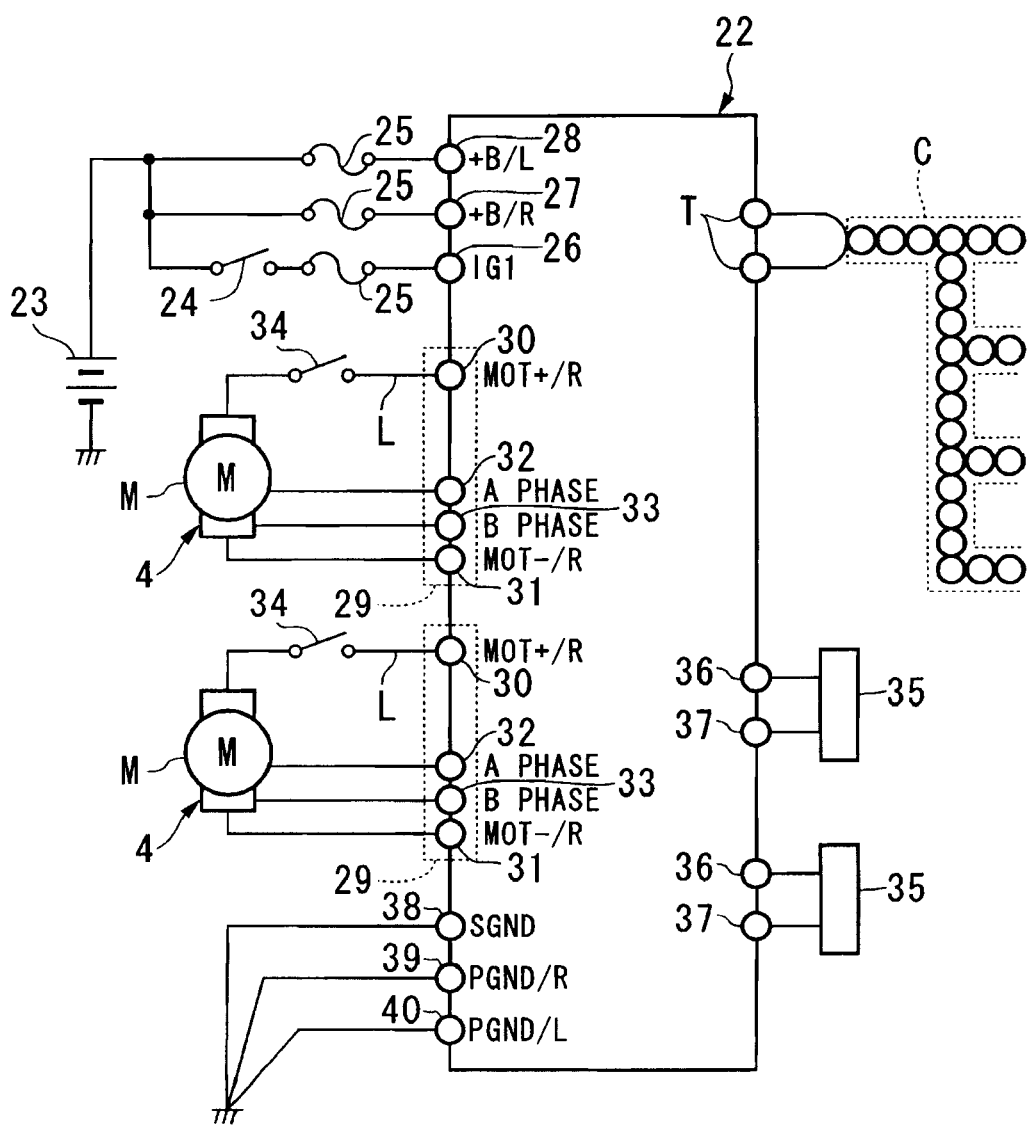
FIG. 3 is a schematic connection diagram illustrating a controller according to the present embodiment.

As shown in FIG. 3, the controller 22 includes a terminal (IG1) 26 which is connected to a battery 23 through an ignition switch 24 and a fuse 25, a terminal (+B/R) 27 which is connected to the battery 23 through the fuse 25 irrespective of an ON/OFF state of the ignition switch 24, and a terminal (+B/L) 28.

Two pairs of terminals 36 and 37 of the controller 22 are connected to buckle switches 35, respectively. The buckle switches 35 are mounted in seatbelt buckles (not shown) of the driver seat and the assistant seat of the vehicle, and are short-circuit to output an ON signal when a tongue plate (not shown) in inserted into the seatbelt buckle.

Additionally, terminals T of the controller 22 are connected to a twist pair cable C for a CAN (Controller Area Network) as an in-vehicle network so as to perform a two-way communication with other vehicle-mounted control unit (not shown). In the controller 22, a signal earth terminal (SGND) 38 and a pair of power earth terminal (PGND/R) 39 and a power earth terminal (PGND/L) 40 are one-point grounded, respectively, and are connected to a minus terminal of the battery 23 through a vehicle structure, etc.

The controller 22 includes a pair of control terminals 29 which is connected to the retractors 4 of the seatbelt units 1 which are disposed in the driver seat and the assistant seat, respectively. Each of the control terminals 29 includes a terminal (MOT+/R) 30 and a terminal (MOT−/R) 31 which supply driving power to the motor M, a terminal 32 (A phase)

which is connected to the first hall element 20 of the sensor 19, and the terminal 33 (B phase) which is connected to the second hall element 21 thereof.

A heat protecting switch 34 of the motor M is provided in the course of a power line L which is connected to each of the power terminals 30, and is configured to be opened in response to a control instruction generated by the controller 22 when it is determined that current flowing to the power line L measured by a current sensor (not shown) mounted in the controller 22 is larger than a predetermined value. Alternatively, the switch 34 may be configured as a thermistor, etc. so as to reduce current when current larger than a predetermined value flows to the power line L.

A detection signal output from the first hall element 20 is input to the terminal 32 and a detection signal output from the second hall element 21 is input to the terminal 33. The controller 22 determines the rotation angle of the spindle 5, that is, the wound amount of the belt B and consumption current of the first and second hall elements 20 and 21 based on the detection signals input to the terminals 32 and 33.

Figure 4A:
FIG. 4A is an explanatory view illustrating first and second hall elements according to the embodiment, which schematically illustrates a positional relationship between a magnetic pole and the first and second hall elements.

Specifically, as shown in FIG. 4A, the first hall element (HALL 1) and the second hall element (HALL 2) are arranged so as to be away from each other at a predetermined rotation angle. At this time, output signals therefrom change depending on whether polarity of the magnetic pole ring 18 opposed to the first and second hall elements 20 and 21 is an N pole or an S pole. Additionally, when the first and second hall elements 20 and 21 are opposed to the magnetic pole ring 18 with an N pole, consumption current thereof becomes large. On the other hand, when the first and second hall elements 20 and 21 are opposed to the magnetic pole ring 18 with an S pole, consumption current thereof becomes small.

Figure 4B:
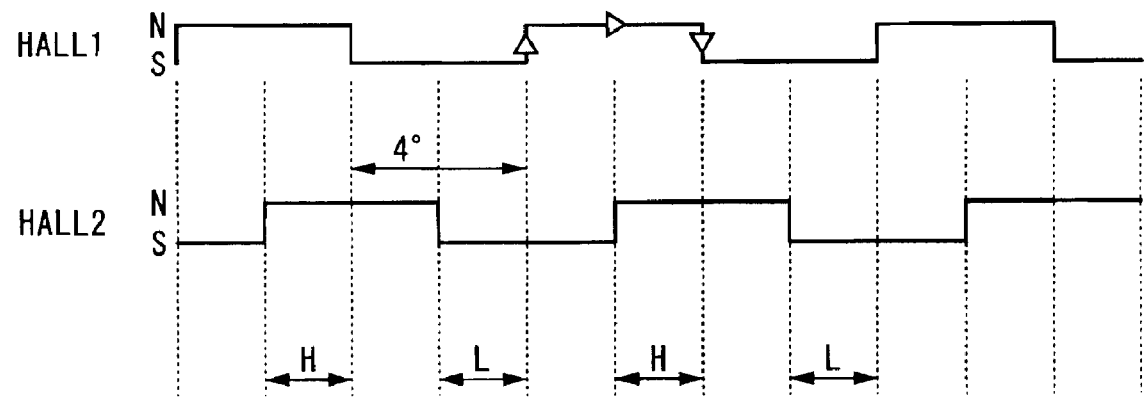
FIG. 4B is a graph illustrating consumption current.

As shown in FIG. 4B, when the horizontal axis is denoted by a rotation angle, the first and second hall elements 20 and 21 are alternatively opposed to the N pole and the S pole in a uniform period, respectively, and consumption current (vertical axis) of the first and second hall elements 20 and 21 repeatedly changes from a high state to a low state or from a low state to a high state in a predetermined period. Here, consumption current of the rotation angle sensor 13 is in the highest state when both the first and second hall elements 20 and 21 are opposed to the N pole (a region depicted by 'H' in FIG. 4B). On the other hand, consumption current of the rotation angle sensor 13 is in the lowest state when both the first and second hall elements 20 and 21 are opposed to the S pole (a region depicted by 'L' in FIG. 4B).

Additionally, in FIG. 4B, a period of an output signal of the second hall element 21 is set to be slower than that of the first hall element 20 by ¼ period. For example, when one period is 8° in a rotation angle and the number of the hall elements is one, the rotation angle of the spindle 5 can be detected at every 4° corresponding to a half of 8°. However, since the first and second hall elements 20 and 21 are arranged to be away from each other by a ¼ period, the detection signal of one of the first and second hall elements 20 and 21 changes at every ¼ period, and thus the rotation angle of the spindle 5 can be detected at every 2°. FIG. 4B is an example in which the magnetic pole ring 18 is rotated in a direction where the belt B is configured to be wound. For example, in such a configuration, when the magnetic pole ring 18 is rotated in a direction where the belt B is configured to be drawn, the period of the second hall element 21 advances by ¼ period more than that of the first hall element 20.

Figure 5:
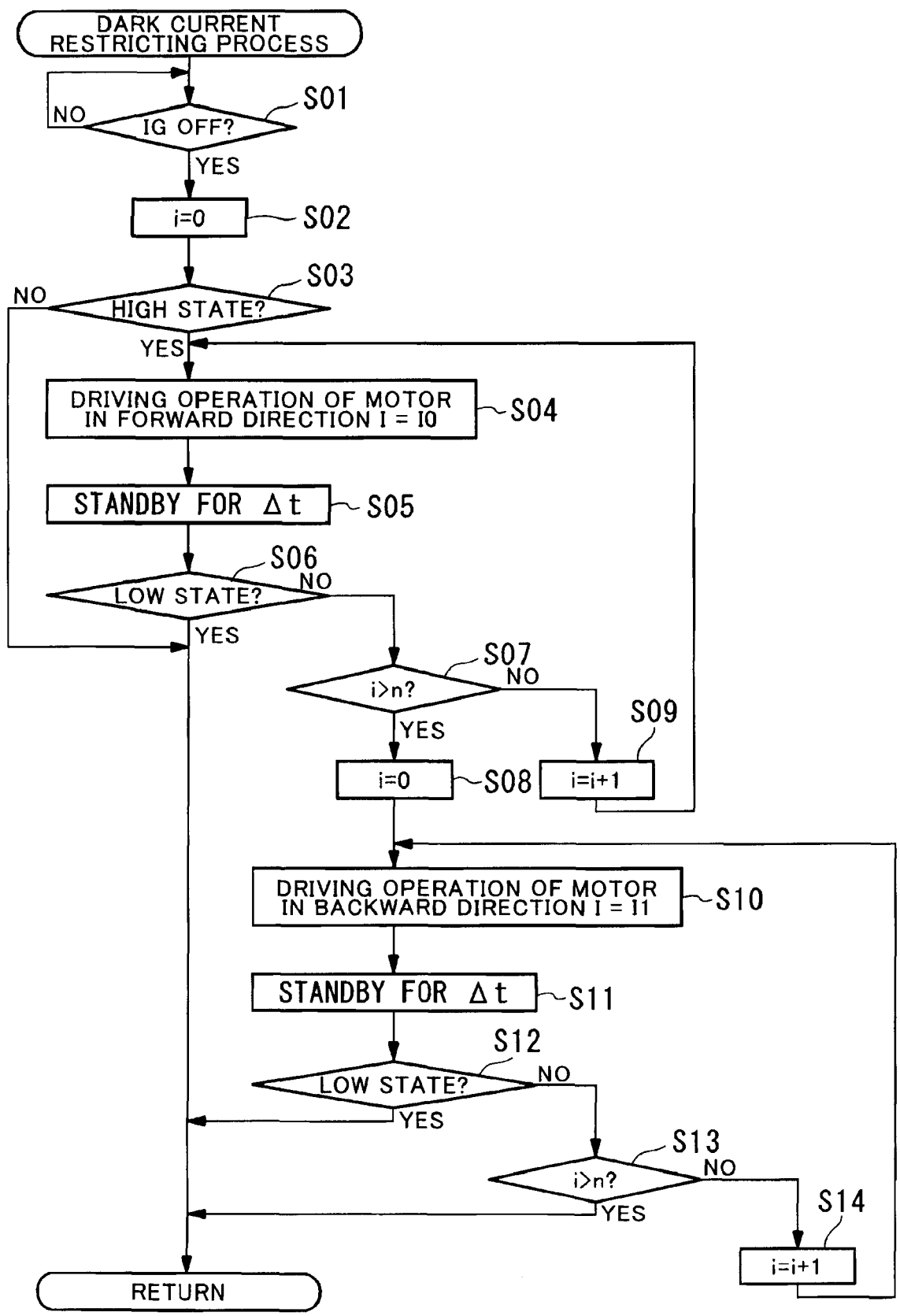
FIG. 5 is a flowchart illustrating a dark current controlling process according to the present embodiment.

Next, a dark current restricting process of the controller 22 of the seatbelt unit 1 with the above-described configuration will be described with reference to a flowchart shown in FIG. 5.

First, in STEP S01, it is determined whether the ignition switch 24 is changed from an ON state to an OFF state. That is, in this process, an initial condition is set to a state where the ignition switch 24 is in an OFF state and the controller 22 controls the driving operation of a machinery using power (dark current) supplied through the terminals 27 and 28. When the determination result obtained in STEP S01 is 'YES' (when the ON state is changed to the OFF state), the current process advances to STEP S02. On the other hand, when the determination result is 'NO' (when the ON state is maintained), the process in STEP S01 is repeated.

In STEP S02, a counter value 'i' is set to '0' in order to reset a counter for counting the numbers.

In STEP S03, it is determined whether consumption current of both the first and second hall elements 20 and 21 is in a high state (first state). When the determination result in STEP S03 is 'YES' (in a high state), the current process advances to STEP S04. On the other hand, when the determination result in STEP S03 is 'NO' (not in a high state), the process ends and returns.

Here, when consumption current of the first and second hall elements 20 and 21 of the seatbelt units 1 provided in the driver seat and the assistant seat is in a high state (e.g., 12 to 18 mA/1 unit), consumption current of the seatbelt unit 1 is in the highest state (e.g., 18 mA×4 units=72 mA). On the other hand, when consumption current of the first and second hall elements 20 and 21 thereof is in a low state (e.g., 4 to 7 mA/1 unit), consumption current of the seatbelt unit 1 is in the lowest state (e.g., 7 mA×4 units=28 mA).

In STEP S04, when consumption current of both the first and second hall elements 20 and 21 is in a high state, uniform current (I=I0) is energized to the motor M for a predetermined time to rotate the motor M in a forward direction (winding direction), and then the energization is stopped so that consumption current of both the first and second hall elements 20 and 21 becomes a low state.

Here, the predetermined time mentioned in STEP S04 means a time in which the motor M is driven so that a state where consumption current is in the highest state (first state) when the first and second hall elements 20 and 21 are opposed to the N pole is changed to a state where consumption current is in the lowest state (second state) when the first and second hall elements 20 and 21 are opposed to the S pole. That is, since current energized to the motor M is uniform and rotation speed of the motor M is substantially uniform, rotation speed of the magnetic pole ring 18 connected to the motor M is uniform, and thus the magnetic pole ring 18 is rotated by a predetermined angle upon energizing the motor M for a predetermined time.

In STEP S05, the magnetic pole ring 18 is rotated in the forward direction and the current process advances to STEP S06 after a standby for a predetermined time Δt using a timer.

In STEP S06, it is determined whether consumption current of the first and second hall elements 20 and 21 is in a low state. When the determination result is 'YES' (in a low state) in STEP S06, since consumption current of the rotation angle sensor 13 is in a low state, the current process ends and returns. On the other hand, when the determination result is 'NO' (not in a low state), the current process advances to STEP S07.

Here, the process in STEP S05 advances to the subsequent STEP S06 after a standby for a predetermined time Δt and it is determined whether consumption current is in a low state. In other words, it is possible to detect a state where consumption current becomes a low state for a predetermined time Δt, that is, while the timer is operated, in terms of the determination process carried out after a predetermined time Δt.

Instead of the processes carried out in STEP S05 to STEP S06, it is possible to sequentially determine whether consumption current becomes a low state for a predetermined time Δt (hereinafter, the same applies to STEP S11 and STEP S12).

In STEP S07, it is determined whether the counter value 'i' is larger than a predetermined number of times n. When the determination result is 'NO' (not i>n), the current process advances to STEP S09.

In STEP S09, '1' is added to the counter value 'i' (i=i+1), the current process returns to STEP S04 to repeat the above-described process. That is, the motor is driven to perform a winding operation by a predetermined number of times n until consumption current of the first and second hall elements 20 and 21 becomes a low state. On the other hand, when the determination result obtained in STEP S07 is 'YES' (i>n), the current process advances to STEP S08.

In STEP S08, since consumption current of the first and second hall elements 20 and 21 is not in a low state even after the motor M is driven to perform a winding operation by a predetermined number of times n, the counter value 'i' is reset (i=0), the current process advances to STEP S10.

In STEP S10, in order to drive the motor M in a backward direction, uniform current I (I=−I1) having polarity opposite to that of current I in a forward direction is energized to the motor M for a predetermined time and is stopped.

Here, the driving operation carried out in the backward direction means that the motor M is controlled to be rotated in a backward direction opposite to the forward direction, that is, in a direction where the belt B is configured to be drawn. At this time, when the motor M is controlled to be rotated in the direction where the belt B is drawn and the magnetic pole ring 18 is rotated up to a position where both the first and second hall elements 20 and 21 are opposed to the S pole, consumption current is controlled to be in a low state (second state).

In STEP S11, the current process advances to STEP S12 after a standby for a predetermined time Δt in the same manner as STEP S05.

In STEP S12, in the same manner as STEP S06, it is determined again whether consumption current of the first and second hall elements 20 and 21 is in a low state. When the determination result obtained in STEP S12 is 'YES' (in a low state), consumption current of the rotation angle sensor 13 is in a low state, and thus the current process ends and returns. On the other hand, when the determination result is 'NO' (not in a low state), the current process advances to STEP S13.

In STEP S13, it is determined whether the counter value 'i' is larger than a predetermined number of times n. When the determination result is 'NO' (not i>n), the current process advances to STEP S14.

In STEP S14, '1' is added to the counter value 'i' (i=i+1), the current process returns to STEP S10 to repeat the above-described process. That is, in the same manner as STEP S04 to STEP S09, the motor M is driven to rotate in the drawing direction by a predetermined number of times n until consumption current of the first and second hall elements 20 and 21 becomes a low state.

On the other hand, when the determination result obtained in STEP S13 is 'YES' (i>n), an abnormal state may occur in that consumption current does not become a low state even after the motor M is driven by a predetermined number of times n. Accordingly, the current process ends so as not to apply a load to a position where the abnormal state occurs and to restrict consumption current from increasing because the motor is not uselessly driven. When the determination result obtained in STEP S13 is 'YES', the abnormal state may be informed to a passenger.

Therefore, according to the above-described embodiment, the controller 22 can allow the rotation angle sensor 13, which outputs a plurality of outputs including a state where consumption current is in a high state and a state where consumption current is in a low state in accordance with the rotation of the spindle 5 around which the belt B is wound, to be in the state where consumption current is in a low state by controlling the driving operation of the motor M. Thus, it is possible to reduce a load of the battery 23 by restricting consumption current of the rotation angle sensor 13.

In STEP S05, when consumption current becomes a high state during a standby for a predetermined time Δt after consumption current of the rotation angle sensor 13 is in a low state, the controller 22 can drive the motor M until consumption current is in a low state. Thus, it is possible to more securely restrict consumption current of the rotation angle sensor 13.

When consumption current becomes a high state after consumption current of the rotation angle sensor 13 is in a low state, the controller 22 can drive the motor M so that consumption current is in a low state. Also, when dark current does not become a low state even after the motor M is driven by a predetermined number of times n, for example, the rotation angle sensor 13 may be in an abnormal state, and thus it is possible to reduce a load of the battery 23 by stopping the driving operation of the motor M to prevent current from being uselessly consumed while driving the motor M.

Uniform current I is energized to the motor M, and thus it is possible to allow consumption current of the rotation angle sensor 13 to be in a low state without a discontinuous rotation of the spindle 5 resulting in unpleasant feeling to a passenger.

When a measured current value obtained by current sensor of the controller 22 is larger than a predetermined value while controlling the driving operation of the motor M, the motor M may not rotate even in the state where the controller 22 controls the driving operation thereof. Accordingly, it is possible to protect the motor M by controlling the heat protecting switch 34 of the motor M to be in an OFF state so that the motor M is not energized.

When a desired result cannot be obtained even after the motor M is rotated in the winding direction, the motor M can be controlled to be rotated in the backward direction. Thus, it is possible to allow consumption current to be in a low state by rotating the magnetic pole ring 18 in the backward direction.

The present invention is not limited to the above-described embodiment, but may be configured such that consumption current becomes a high state when the first and second hall elements 20 and 21 are opposed to the S pole.

In the above-described embodiment, the driving operation of the motor M is controlled only when both the first and second hall elements 20 and 21 are opposed to the N pole, that is, when consumption current is in the highest state. However, for example, consumption current may be controlled to be in the lowest state when any one of the first and second hall elements 20 and 21 is opposed to the N pole. In such a configuration, it is possible to obtain in advance a predetermined rotation angle of the magnetic pole ring 18 which is necessary to allow consumption current of any one of the first and second hall elements 20 and 21 to be changed from a high state to the lowest state. Thus, in STEP SO4 and STEP S10, the motor M may be driven for a predetermined time which is necessary to rotate the motor M by the predetermined rotation angle.

In the above-described embodiment, it has been described about a case where the motor M is driven for a predetermined time in STEP S04 and STEP S10. However, the driving operation of the motor M may be stopped when consumption current is in the lowest state by monitoring the outputs of the first and second hall elements 20 and 21 at a normal time.

In the dark current restricting process, it is determined that dark current is used depending on whether the ignition switch 24 is changed from an ON state to an OFF state in STEP S01. However, it may be determined that dark current is used depending on, for example, whether a vehicle door is changed from an opened state to a closed state or whether the buckle switch is in an OFF state.

In the above-described embodiment, it has been described about a case where the spindle 5 and the retainer 17 are rotated in the forward direction or the backward direction by controlling the rotation of the motor M. However, a known device may be used in which a transmitting device is separated when the motor M is rotated in the backward direction, and when such a known device is used, the connection between the motor M and the spindle 5 is released so that a predetermined amount of rotation can be carried out by a weight of the tongue or an urging force of the spring 12. Thus, it is possible to more securely to obtain a low consumption current state.

In the above-described embodiment, it has been described about a case where the period of the second hall element 21 is later than that of the first hall element 20 by ¼ period upon winding the belt B. However, the period of the second hall element 21 may be later than that of the first hall element 20 by ¼ period upon drawing the belt B by, for example, allowing the period of the second hall element 21 to be deviated from that of the first hall element 20 by ¼ period in a movement direction upon winding the belt B.

In the above-described embodiment, it has been described about a case where the first and second hall elements 20 and 21 are provided, but the number of the hall elements provided in the rotation angle sensor 13 is not limited to two.

In the above-described embodiment, consumption current is controlled to be in the lowest state, but consumption current may be controlled in a middle state so that a current value is smaller than that in the highest state and is larger than that in the lowest state.

While a preferred embodiment of the present invention has been described and illustrated above, it should be understood that this is an exemplary of the present invention and is not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claim is:

1. A seatbelt apparatus, comprising:
a belt reel around which a belt is wound;
a motor which rotationally drives the belt reel;
a transmitting device which transmits a driving power between the belt reel and the motor;
a controller which drives the motor while controlling an electricity to be supplied to the motor;
a rotation-detection device which detects a rotational position of the belt reel and consumes a varying amount of electrical current depending upon the rotational position of the belt wheel, the rotation-detection device including at least one hall element and a magnetic pole ring with a first pole and a second pole, the magnetic pole ring being rotationally coupled to the belt reel, wherein:
the rotation-detection device outputs, in accordance with rotational position of the belt reel, a plurality of outputs including signals indicating a first state in which the current consumption by the rotation-detection device is larger than a predetermined value because of a close proximity of the at least one hall element to the first pole of the magnetic pole ring, and a second state in which the current consumption by the rotation-detection device is smaller than the predetermined value because of a distant proximity of the at least one hall element to the first pole of the magnetic pole ring; and
the controller executes a first motor-driving process to rotate the motor until the rotation-detection device outputs the signal indicating the second state so as to reduce the current consumption of the rotation-detection device.

2. The seatbelt apparatus according to claim 1, wherein the controller comprises a timer which works for a predetermined time since the rotation-detection device has reached the second state, and repeats the first motor-driving process when the rotation-detection device is shifted to the first state while the timer is in operation.

3. The seatbelt apparatus according to claim 1, wherein the controller
repeats the first motor-driving process until the rotation-detection device reaches the second state again when the rotation-detection device is shifted from the second state to the first state, and
stops repeating the first motor-driving process after executing the first motor-driving process for predetermined times, even when the rotation-detection device is in the first state.

4. The seatbelt apparatus according to claim 1, wherein the controller continues controlling the electricity to be supplied to the motor so as to be constant, until the rotation-detection device reaches the second state.

5. The seatbelt apparatus according to claim 1, wherein the controller
comprises a current-measuring device which measures the current to be supplied to the motor, and
decreases or stops the electricity to be supplied to the motor while driving the motor, if the current measured by the current-measuring device exceeds a predetermined value.

6. A seatbelt apparatus, comprising:
a belt reel around which a belt is wound;
a motor which rotationally drives the belt reel;
a transmitting device which transmits a driving power between the belt reel and the motor;
a controller which drives the motor while controlling an electricity to be supplied to the motor;
a rotation-detection device which detects a rotation status of the belt reel, wherein:
the rotation-detection device outputs, in accordance with a rotation of the belt reel, a plurality of outputs including signals indicating a first state in which a current consumption by the rotation-detection device is larger than a predetermined value, and a second state in which the current consumption by the rotation-detection device is smaller than the predetermined value;
the controller executes a first motor-driving process in which the motor is driven based on an output from the rotation-detection device until reaching the second state, and wherein
if the controller has detected that the rotation-detection device has shifted to the first state after shifting to the second state by executing the first motor-driving process,
then the controller executes a second motor-driving process in which the motor is driven in a backward direction in relation to a rotational direction in the first motor-driving process, until the rotation-detection device reaches the second state.

* * * * *